Dec. 4, 1956    M. T. WADDELL    2,773,019
CONTROL OF HYPOCHLORITE TREATING OPERATION
Filed July 26, 1954    3 Sheets-Sheet 1

INVENTOR.
Mathis T. Waddell,
BY
ATTORNEY.

United States Patent Office 2,773,019
Patented Dec. 4, 1956

2,773,019

CONTROL OF HYPOCHLORITE TREATING OPERATION

Mathis T. Waddell, Baytown, Tex., assignor, by mesne assignments, to Esso Research and Engineering Company, Elizabeth, N. J., a corporation of Delaware Application July 26, 1954, Serial No. 445,554

2 Claims. (Cl. 204—1)

The present invention is directed to a method for analyzing a hypochlorite solution used in sweetening hydrocarbons. More particularly, the invention is directed to a method for controlling a hypochlorite sweetening operation. In its more specific aspects, the invention is directed to a method for analyzing a spent alkaline hypochlorite solution from a hypochlorite sweetening operation for available chlorine content and adding chlorine to the hypochlorite solution in response to voltage changes obtained by adding a reducing agent suitable for use in an alkaline medium to the hypochlorite solution.

The present invention may be briefly desccribed as involving a method for controlling a hypochlorite sweetening operation in which a sour hydrocarbon oil containing mercaptans and boiling in the range up to about 750° F. is contacted with an alkaline hypochlorite solution such as aqueous solutions of sodium or calcium hypochlorite. The spent solution from the sweetening operation is withdrawn and a controlled amount of the spent solution has admixed with it a controlled amount of an aqueous reducing solution such as sodium meta-arsenite or sodium mercaptide. A voltage is obtained from the admixture, by contacting same with dissimilar electrodes in an electrode system connected to a suitable recorder or indicator, which is a measure of the chlorine content of the withdrawn solution. Thereafter chlorine may be added to another portion of the withdrawn solution responsive to the voltage obtained by admixing a portion of the spent hypochlorite solution with the reducing solution. Thereafter, the solution containing added amounts of chlorine is employed to sweeten or contact additional amounts of the sour hydrocarbon oil.

The electrode system employed in the present invention may be platinum-silver or platinum-calomel electrodes; the platinum-calomel system is preferred because the standard half cell afforded by the saturated calomel electrode produces few, if any, difficulties in instrumentation.

The "available chlorine," determined as stated, is a term well known to chemists. It may be defined as chlorine present in reducible form, and is expressed as the elementary chlorine equivalent. Thus, chlorine present in solution in the compound NaOCl is "available," whereas chlorine present in the compound NaCl is not "available."

The present invention is particularly suitable for the continuous analysis of hypochlorite solutions wherein a flowing stream of used alkaline hypochlorite solution is withdrawn from a commercial hypochlorite sweetening process. In the present invention a portion of the withdrawn solution is analyzed by a particular method and the electric output from the analysis may be employed to operate a valve to control the chlorine content and/or the rate of contact of the refortified hypochlorite solution with additional portions of sour naphtha. It is desirable that the available chlorine content of the hypochlorite solution removed from contact with the sour oil be in the range between 0.1 and 1.0 gram per liter, and preferably around 0.3 gram per liter.

The invention will be further illustrated by reference to the drawing in which.

A suitable vessel is provided containing suitable electrodes, such as platinum and a sleeve-calomel electrode connected to a voltage indicator reading from at least 0 to +200 mv. A controlled volume of sodium hypochlorite solution and a controlled volume of aqueous solution of reducing agent, specifically sodium arsenite, are continuously charged to the stirred vessel, the reactant solution being removed by overflow device. By adjusting the rate of flow of the reducing solution of a suitable strength, data were obtained by analyzing a series of hypochlorite solutions of known concentration for available chlorine. These data are plotted as Fig. 1.

Figure 1:
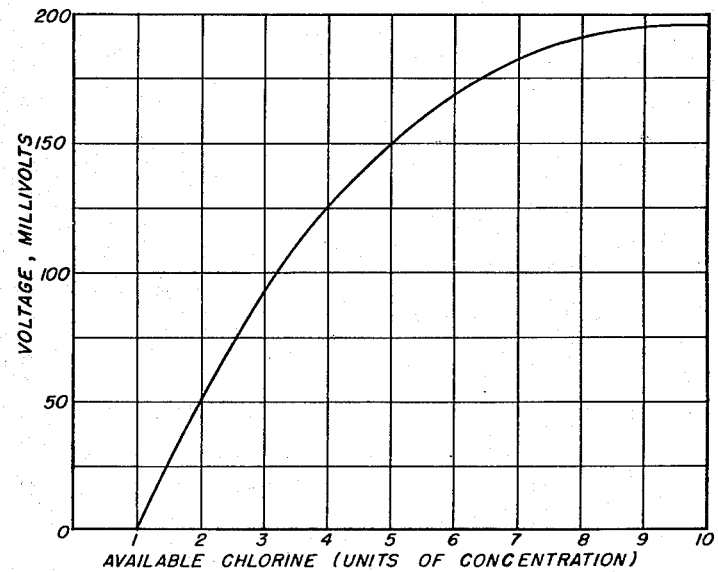
Fig. 1 shows a relationship between available chlorine and voltage.

It will be seen from Fig. 1 that as a high concentration of available chlorine is reached, the voltage approaches 200 mv. The available chlorine concentration at which 0 mv. and at which 200 mv. is reached may be adjusted by varying the rates of flow of said hypochlorite solution and of reducing agent. Thus, the voltage reading is a direct indication of the concentration of available chlorine, until 200 mv. is approached.

Additional runs were made in which a reducing solution of 1 gram per liter of sodium arsenite was employed. Total rate of addition to a 100 volume titrating vessel was 39, 42, and 45 volumes per minute, respectively. The ratio of the addition of reducing reagent was in the range from 0.5 to 5:1 and specifically was 3.33:1, 2.5:1 and 0.5:1, respectively, for the volumes given. A recorder having a dial in which 100 units corresponded to 200 mv. was connected to platinum-calomel electrodes in the admixture. Data were obtained which are plotted as Figs. 2, 3, and 4.

Figure 2:
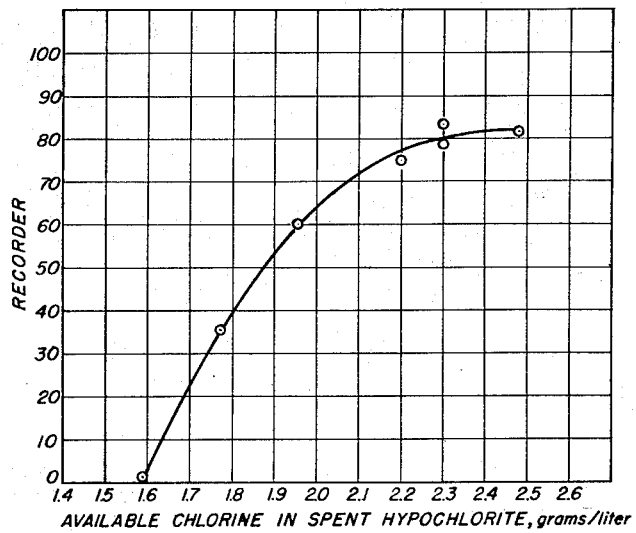
Fig. 2 shows a relationship between available chlorine and the readings on a suitable recorder.
Figure 3:
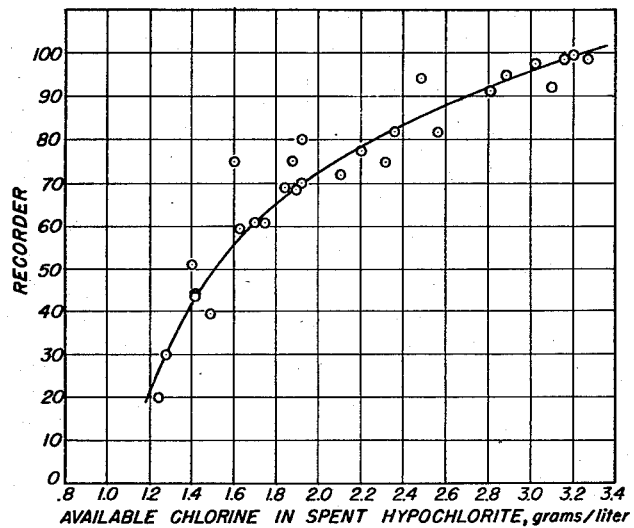
Fig. 3 is a plot of data similar to Fig. 2 at different ratios of reducing solution and spent hypochlorite.
Figure 4:
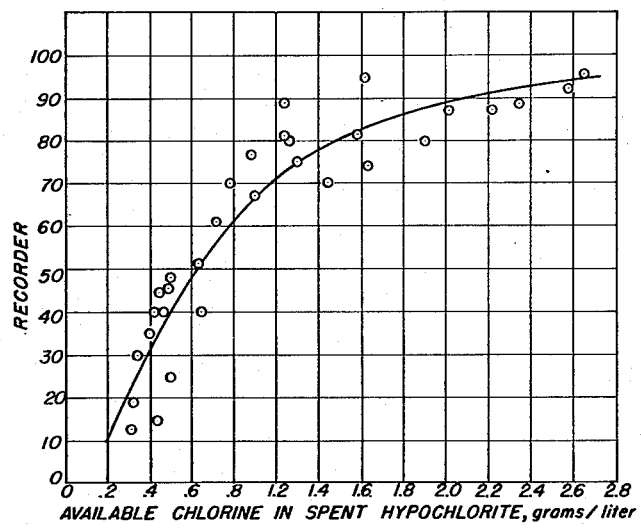
Fig. 4 is another plot of data similar to Figs. 2 and 3 at different ratios.

From an examination of these figures it is seen that Fig. 2 may be employed for measuring available chlorine concentrations between 1.6 and 2.3 grams per liter. Fig. 3 is suitable for concentrations between 1.2 and 3.0 grams per liter, and Fig. 4 for concentrations between 0.2 and 2.0 grams per liter.

Thus, it is clear that changing the rates and ratios of rates of addition will allow analysis of solutions of other concentrations.

In the present invention, the reaction between sodium hypochlorite and sodium arsenite is not instantaneous. Thus, if the solutions were not added continuously to the titrating vessel, and overflow removed, the voltage would very soon reach a constant value of +200 mv. or —200 mv., depending on which solution is present in excess when the reaction becomes complete. This delay in the completion of the reaction in a basic medium allows the particular invention to be used in controlling hypochlorite sweetening operations.

The invention will be further illustrated by reference to Fig. 5 in which numeral 11 designates a charge line to which a sour naphtha, and the like, such as one boiling in the gasoline boiling range and containing mercaptans, is introduced into the system from a source not shown. It will be desirable that the sour naphtha in line 11 be subjected to a preliminary wash with alkaline solution such as sodium hydroxide and the like to remove hydrogen sulfide which would consume the hypochlorite solution.

Admixed with the sour naphtha in line 11 is an alkaline hypochlorite solution introduced by line 12 from a source which will be further described. The sour naphtha and the hypochlorite solution are intimately admixed in a mixing device, such as a baffle-type incorporator 13. While a baffle-type incorporator is shown, other mixing devices such as pumps, contacting towers, stirrers, agitators and the like may be used. The contacted sour naphtha and solution from incorporator 13 are discharged by line 14 into a settling zone 15 which is of sufficient capacity to allow a residence time for separation between the contacted naphtha and the hypochlorite solution. The contacted or treated naphtha is discharged from the settling zone 15 by line 16 for use as a fuel or for blending purposes, as desired.

The spent hypochlorite solution is withdrawn from settling zone 15 by line 17 and may be divided into two portions, one portion being routed by line 18 controlled by valve 19 and pumped by pump 20 which is preferably a constant volume pump into a titrating vessel 21 which is provided with a stirrer 22 attached to a shaft 23 which is connected to a prime mover, such as an electric motor 24, for stirring the contents of the vessel 21.

As the spent hypochlorite solution is discharged by line 18 into vessel 21 there is added to the vessel 21 from a tank 25 an aqueous reducing solution, such as sodium arsenite, by way of line 26 controlled by valve 27 and containing pump 28, which is preferably a constant volume pump.

Arranged in the vessel 21 are electrodes 29 and 30 which may be a platinum and a calomel electrode, respectively. These electrodes 29 and 30 are connected, respectively, by conductors 31 and 32 to a recorder-controller 33 provided with a dial 34 and an indicator 35 for displaying a value as the result of the voltage generated between the electrodes 29 and 30 by the admixture in vessel 21.

This voltage may be suitably carried by means of an electric conductor 36 to a control valve 37 in line 38 to control the addition of chlorine to the spent hypochlorite solution as will be described further. Similarly, the voltage may be converted, by means well known to the art, into a pneumatic impulse, suitable for operating valve 37.

The other portion of the spent hypochlorite solution is routed by way of line 39 containing pump 40 into a chlorinating vessel 41 where it is contacted with chlorine admixed through line 38 controlled by valve 37. The chlorinated hypochlorite solution is then discharged from chlorinating vessel 41 by line 42 which connects into line 12 for admixing the hypochlorite solution into contact with the sour naptha in line 11 in incorporator 13. Provision is made for discarding spent hypochlorite from time to time as requirements may dictate through branch line 43 controlled by valve 44 and for admitting makeup hypochlorite into the system by opening valve 45 in line 12 which connects to a source of fresh hypochlorite.

Figure 5:
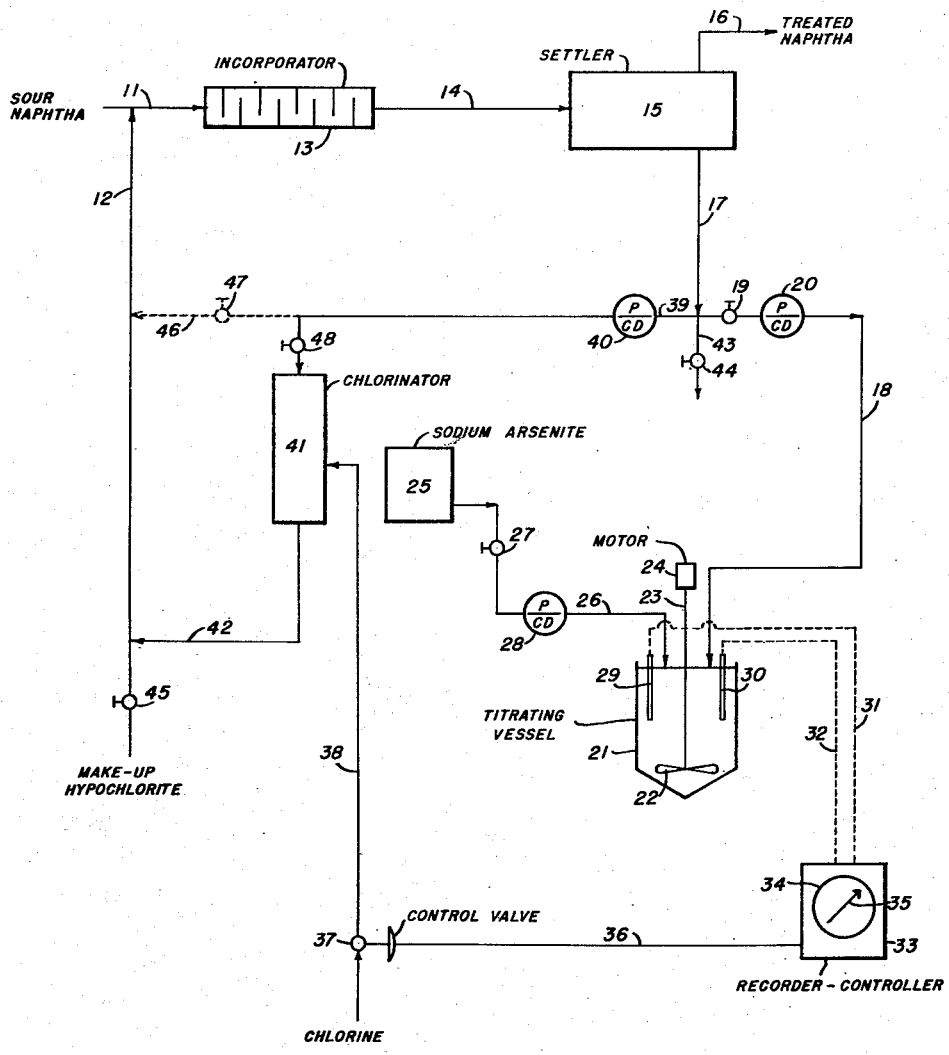
Fig. 5 is a flow diagram of a preferred mode of practicing the present invention.

The present invention, as described with respect to Fig. 5 allows the variations in voltage resulting from the continuous addition of the reducing solution to the spent hypochlorite solution to maintain the available chlorine content of the withdrawn hypochlorite solution at a preselected figure or to maintain the available chlorine content of the hypochlorite solution in line 12 at a value in the range between 1 and 100 grams per liter, such as to produce a spent solution having 0.1–1.0 gram of available chlorine per liter.

In respect to the mode of Fig. 5, under some conditions it may be desirable to by-pass all or a part of the hypochlorite solution in line 39 around the chlorinator 41. To this end a connecting line 46 indicated by the dotted lines and a control valve 47 may be provided. In this connection, it may be desirable to provide a valve 48 in line 39 to control the amount of solution passed through the chlorinator 41.

The sodium meta-arsenite solution in the practice of the present invention may have a concentration as an aqueous solution in the range from 0.2 to 3.0 grams per liter and may be employed at rates in the range from 0.5 to 5.0 volumes per minute while the spent hypochlorite solution is employed at a rate of 1.0 per minute.

The hypochlorite treating solution may have a free alkalinity in the range between 50 and 250 grams of free NaOH per liter of solution. The available chlorine content of the hypochlorite treating solution may suitably be in the range from 1.0 to 100 grams per liter.

When an aqueous solution of a hypochlorite reactive sodium mercaptide is used as the alkaline reducing agent, such solutions may have a concentration of sodium mercaptide in the range between 0.05 and 0.74 gram of mercaptan sulfur per liter.

It is to be emphasized that the present invention is carried out in a basic medium wherein there is a delay in the reduction of hypochlorite with soduim meta-arsenite as exemplified in the reaction illustrated by the following equation:

$$NaOCl + NaAsO_2 + 2NaOH \rightarrow NaCl + Na_3AsO_4 + H_2O$$

In utilizing this reaction, the sodium meta-arsenite solution may be made up by dissolving sodium meta-arsenite in distilled water. 1.83 grams of $NaAsO_2$ will reduce 1.05 grams of sodium hypochlorite, or 1.0 gram of available chlorine.

The nature and objects of the present invention having been completely described and illustrated, what I wish to claim as new and useful and to secure by Letters Patent is:

1. A method operable in an analysis system comprising spaced electrodes and means for detecting a voltage generated therebetween for determining the available chlorine remaining in a spent aqueous alkaline hypochlorite solution utilized for the treatment of sour petroleum hydrocarbons, said hypochlorite solution containing from about 50 to 250 grams of sodium hydroxide per liter and from about 0.1 to 1.0 gram per liter of available chlorine, said method comprising the steps of continuously mixing an aqueous sodium meta-arsenite solution of fixed concentration and containing from about 0.2 to about 3.0 grams per liter of sodium meta-arsenite with said spent hypochlorite treating solution and flowing said mixture through said system in contact with said electrodes, said sodium meta-arsenite solution being admixed with said hypochlorite solution in an amount sufficient to provide a voltage within the range of about 0 to 200 millivolts at a flow rate within the range of about 0.5 to 5 volumes of sodium meta-arsenite solution per volume of hypochlorite solution per minute, whereby said voltage is a measure of the available chlorine content of said hypochlorite solution.

2. A method as in claim 1 wherein the said system comprises a platinum electrode and a calomel half-cell.

References Cited in the file of this patent

UNITED STATES PATENTS

| 2,289,589 | Pomeroy | July 14, 1942 |
| 2,382,734 | Marks | Aug. 14, 1945 |
| 2,526,515 | Stein | Oct. 17, 1950 |
| 2,608,523 | Waddell et al. | Aug. 26, 1952 |

OTHER REFERENCES

"Journal of the American Waterworks Assn.," vol. 34 (1942), pages 1227 through 1240; article by Marks et al.